United States Patent Office 3,485,664

Patented Dec. 23, 1969

3,485,664

METHOD FOR APPLYING ELECTRO-CONDUCTIVE PATTERN ON NON-CONDUCTIVE SURFACES

Roger E. Ernsthausen, Luckey, and Clarence M. Myers, Perrysburg, Ohio, assignors to Owens-Illinois, Inc., a corporation of Ohio No Drawing. Filed Dec. 14, 1966, Ser. No. 601,566
Int. Cl. B44d *1/52, 1/18*
U.S. Cl. 117—212 4 Claims

ABSTRACT OF THE DISCLOSURE

A method for producing an electrically conductive pattern on a glass substrate comprising the steps of applying on the substrate a first film of a polyvinyl ester, cutting said desired pattern into said ester film, removing the film from the surface areas where no conductive coating is desired, applying a second high temperature film of an organic sulfate to said substrate, removing the remaining first applied ester film from the areas to be conductively coated, coating the now exposed substrate areas with a conductive metallic oxide and finally removing the remaining film to produce the desired electrically conductive pattern.

The present invention relates generally to the field of electro-conductive surfaces, and more particularly, to a process for producing at least one electrically conductive design on a non-conductive substrate. Specifically, the instant invention pertains to a novel method for applying prescribed defined electro-conductive patterns on at least one surface of a glass article of manufacture.

It is generally known that glass does not have any appreciable electrical conductivity at ambient temperature and it is therefore frequently employed as an electrical insulator. In recent years with the rapid growth of the electronic industries, many attempts have been made to increase the electrical conductivity or reduce the resistivity of glass articles of manufacture. The prior art attempts generally involved the application of a conductive layer of a separate material onto the surface of said glass. The conductive layer was usually applied by spraying or dipping the glass substrate into a solution containing an electrically conductive agent.

The less conventional more complicated processes designed to reduce the inherent resistivity of glass surfaces involve the complicated multiple steps of evaporating volatile solvents containing electrically conductive agents onto hot glass surfaces or by heating volatilizable conductive metals to high temperature for their subsequent deposition on the glass surface. The above procedures were usually employed when it was desired to render the entire surface electro-conductive. When the need arose for electro-coating a limited area of a non-conductive substrate with an electro-conductive reagent, the reagent, was usually applied by brush, swab or screening said surface with a solution containing the conductive reagent, or by dissolving portions of an entire coated surface with acids, and or the like. In the employment of these procedures, many difficulties were often encountered. For example, the inability to produce defined patterns with the brush or swab technique, smearing or smudging with the screening technique, and, in the acid procedure for selectively removing a portion of the electro-conductive coating, the acid often dissolved the glass and loosened the coating film. These prior art techniques are generally applicable only to flat substrates like sheet glass and are often unusable or highly unsatisfactory when it is desired to coat selective areas of the inside surfaces of irregular shaped bodies, like electronic tubes.

It will be appreciated by those skilled in the art that if a novel method is made available for producing a desired electro-conductive pattern on a glass substrate which method avoids the above mentioned disadvantages, said method would represent a useful contribution to the present art. Likewise it will be further appreciated by those versed in the art that if a novel and acceptable method for producing defined patterns of conductive surfaces is effected, such method would have a definite commercial value and would have a positive application in the fields of commerce and science.

Accordingly, it is an object of the present invention to provide a novel method for producing electro-conductive surfaces on essentially non-conductive surfaces.

Another object of the present invention is to provide a method for fabricating described electrically conductive patterns on glass substrates.

A further object of the instant invention is to provide a method for electrically coating select portions on the inside surfaces of glass tubes.

Still a further object of the subject invention is to provide a means for producing conductive designs on at least one surface of a glass substrate.

Yet still a further object of the present invention is to provide a method for producing a fixed, predetermined metallic oxide pattern on a glass substrate.

Yet still a further object of the invention is to provide a means for producing a precisely defined conductive coating on a glass substrate.

Still a further object of the invention is to provide a method for producing a conductive surface on a non-conductive body wherein said method is free from the disadvantages associated with the prior art.

It is still a further object of this invention to provide a method for the application of electro-conductive patterns to vitreous, devitrifiable or other non-conductive materials which are curved, shaped, round, flat or other irregular like shapes.

Another object of the present invention is to provide a conductive coating on a non-conductive substrate wherein said conductive coating is of a continuous and predetermined system.

These and other objects, features and advantages will become self-evident from the following detailed description of the mode and manner of practicing the subject invention.

In attaining the objects, features and advantages of the subject invention it has now been unexpectedly found that electro-conductive or low resistance coatings can be applied in a predetermined pattern to a non-conductive substrate by employing a novel double masking or single masking technique as set forth herein.

Generally, when the above mentioned double masking technique is employed, a thin strippable low temperature organic film is first applied to the non-conductive surface and heat cured at about 120° to 170° C.; this mask is then cut at the desired conductive coating boundary lines of a predetermined pattern. After the cutting step, the strippable mask covering the areas where no conductive coating is desired is removed and the entire surface is coated with a second but chemically different mask that will withstand temperatures as high as 1200° F. Next, the strippable organic mask protecting the areas to be conductively coated is removed leaving the areas where no conductive coating is desired coated with the second high temperature mask. In the final step of the instant process, the object is heated to 1000 to 1200° F. and the surfaces are conductively coated with the conductive agent. After cooling to room temperature, the high temperature mask is removed leaving an electro-conductive coated area in a selected predetermined pattern.

The single masking technique representative of the mode and manner of carrying out the subject invention consists in first heating the non-conductive substrate surface and coating said heated surface with a conductive agent. Next, the hot coated surface is allowed to cool to room temperature and the coated surface is covered with a strippable organic mask which is subsequently cut in the desired pattern. The strippable mask covering the areas where no conductive coating is desired is next removed and the conductive coating in the now exposed areas is swabbed with an aqueous slurry of zinc powder and then with dilute hydrochloric acid to remove the unwanted electro-conductive coating. The strippable mask is finally removed from the rest of the surface to produce the desired conductive pattern.

The materials suitable for forming electro-conductive coatings as employed by the present invention are generally those materials that are capable of forming conductive coatings on non-conductive surfaces. The materials suitable for the present purpose are of the metal oxide type and are usually the oxides of cadmium, indium and tin, and mixtures of said oxides. The oxide coatings are usually applied by spraying a hot glass surface with a solution containing an appropriate metallic salt where, on intimate contact with the hot surface the solvent is eliminated and a residual oxide coating forms on said glass surface. The methods for coating glass surfaces are generally known to the art and are set forth in expired U.S. Patent No. 2,118,795.

Exemplary of the strippable organic mask suitable for the purpose of the present invention are those organic film formers that can be applied to the substrate, removed by stripping and do not adversely affect the substrate or the presently applied electro-conductive coatings. The masking materials are usually organic in nature, commercially available, and of the polyvinylester and desired polymer types. The presently preferred polymer of a vinyl ester is polyvinylacetate. Exemplary of other polyvinyl esters are polyvinyl alcohol, polyvinyl butyral, mixtures thereof and the like.

The high temperature mask employed for the novel purpose of the present invention consists essentially of a three component composition. The commercially available reagents formulating said masking or film forming composition are organic esters, suspending agents and inorganic salts. Exemplary of organic esters are the esters of the general formula RCOOR wherein said R's are the same or different and wherein said R's are lower alkyl groups. The esters generally include methyl acetate, ethyl acetate, n-butyl acetate, amyl acetate, ethyl formate, methyl butyrate and the like. The suspending agent incorporated in the present composition generally includes the suspending agents that are capable of burning away or volatizing at higher temperatures. Examples of suspending agents are nitrocellulose, carboxycellulose, ethylcellulose, methylcellulose and the like. The inorganic salts that can be generally employed for the purpose of the present invention are the salts having a divalent anion, usually $SO_4$, and of the general type $M_2SO_4$, wherein M is a cation. Exemplary of inorganic salts are sodium sulfate, potassium sulfate, calcium sulfate, magnesium sulfate and the like. Also, other acceptable masking forming reagents include refractory oxides like $Al_2O_3$, $TiO_2$, $SnO_2$ and the like.

The methods of the present invention are generally applicable to increase the electrical conductivity of non-conductive substrates that are receptive to procedures and reagents employed herein. The substrates are usually vitreous materials or crystallizable type substrates, preferably vitreous substrates. The vitreous substrates include the commercially available materials such as soda-lime-silica glasses, lead-alkali-silicate glasses, the boro-silicate glasses and the alumino-silicate glasses which are all used for electrical purposes. These glasses as set forth immediately above are well known to the art, and they are disclosed in "Technical Glasses" by M. P. Volf, pages 129 to 150, published by Sir Isaac Pitman and Sons, Ltd., London, in "Class Engineering Handbook" by E. B. Shand, pages 4 to 7, published by McGraw-Hill Book Company, Inc., New York and in expired United States Patent No. 1,304,623.

The following examples are merely illustrative of the present invention and are not to be considered as limiting the spirit and scope of the present invention in any manner, as these and other variations will be readily apparent to those versed in the subject art from the instant disclosure and accompanying claims.

EXAMPLE 1

A predetermined parallel electro-conductive pattern was made on the inside surface of a given piece of commercially available lead-alkali-silicate glass tubing in the following manner: the inside surface was painted first, with a thin, coat or film or polyvinylacetate and dried at about 300° F., (149° C.). This first applied layer was about 2 to 5 mils thick; however, thicker layer can also be employed, for example layers up to 20 mils. After drying, the borders defining the areas to be treated with the electro-conductive coating were cut with a sharp fine knife into the first applied film and the polyvinylacetate was freely removed by stripping from the areas of the tube where no conductive coating was desired. Next, the entire inside surface of the glass tube was coated with a second and chemically different masking film and dried. The second masking film composition consists essentially of 20 grams of anhydrous sodium sulfate, 60 ml. of n-butyl acetate and 5 grams of nitrocellulose. Once the second film had dried, the polyvinylacetate, or first applied film, was freely stripped from the areas where the conductive coating was desired leaving these areas with exposed surfaces and the remaining areas coated with the second masking composition. The glass tube was then heated at about 1150° F. for about 2 to 3 minutes and sprayed with an aqueous-alcoholic solution of stannic chloride. Upon cooling to room temperature, the high temperature mask was removed by washing with water, leaving these latter areas non-coated while the exposed areas were $SnO_2$ coated.

EXAMPLE 2

In this example, a thin coating about 3 to 5 mils, of a strippable organic polyvinylacetate film was brushed onto the inside surface of a piece of commercially available glass tube and the tube dried at about 300° F. The strippable mask was then precisely cut at the desired conductive coating boundary lines using very thin sharp knife blades held as tool bits in a lathe. After the strippable mask was cut, the mask covering the surface area where no conductive coating was desired was removed and the inside surface of glass tube was coated with a second film or layer of a high temperature mask consisting of 600 milliliters of butyl acetate, 10 grams of nitrocellulose and 200 grams of anhydrous sodium sulfate. After the second applied film or high temperature mask had set the first applied strippable mask protecting the areas to be conductively coated was removed leaving the inside surface area coated with the second applied mask in the areas where no conductive coating was desired. The tube was then heated in an electrically heated furnace at about 1100° F. for 2 to 3 minutes and the entire inside surface of the tube was sprayed with a solution of stannic chloride, thereby, conductively coating the exposed non-masked areas and also coating the high temperature three-component mask. After the tube cooled to room temperature, the three-component high temperature mask areas were aqueous washed to remove this mask. The final result was the select coating of certain exposed areas of the inside of the glass tube.

EXAMPLE 3

Following the procedure as set forth in Example 2, specific electro-conductive designs were applied to a glass substrate with all reagents and conditions were as hereinbefore described, except that the composition of the three-component high temperature second applied film was 400 milliliters of butyl acetate. 10 grams of nitrocellulose and 70 grams of sodium sulfate.

EXAMPLE 4

A glass substrate was electrically conductive coated in the following manner: first, a piece of glass tubing was cleaned in a 2:1 aqueous nitric acid bath and rinsed in distilled water: Next, the glass was heated to 1200° F. for 3 minutes and coated at this elevated temperature with tin oxide. After the substrate cooled to room temperature, the just coated surface was covered with strippable polyvinylacetate and after the resin was heat set it was cut at the desired boundary lines. The strippable mask covering the glass substrate areas where no conductive coating was desired was removed and the tin oxide coating in these areas painted with a water slurry of powdered zinc. The zinc areas were next swabbed with dilute hydrochloric acid which effectively removed the tin oxide by chemical reduction. The entire surface was next washed with water and the remaining strippable mask protecting the desired conductive coating patterns stripped free of the glass substrate.

EXAMPLE 6

The high temperature mask employed for the purpose of the present invention was prepared by conventional technique and from commercially available reagents. The three reagents in the high temperature mask can be formulated as follows: to 60 milliliters of n-butyl acetate is added with constant stirring 5 grams of nitrocellulose and 20 grams of sodium sulfate. The stirring was continued until the reagents were well blended and then the blend was milled on a ball mill. The milled composition was then used as above described for the high temperature mask.

EXAMPLE 7

A second high temperature masking material was prepared as follows: 600 milliliters of n-butyl acetate and 10 grams of nitrocellulose were then rolled milled until a homogenous mixture was obtained. Next, 200 grams of anhydrous sodium sulfate was milled into the two component homogenous mixture and ball milling was continued until a homogenous composition was obtained. The masking composition was then ready for use according to the mode and manner of the instant invention.

EXAMPLE 8

The inside surface of a glass tube used for information storage and memory instruments was first coated with polyvinylacetate and heated at about 300° F. until the resin was clear and dry. The desired geometric boundaries of shaped pattern were cut into the resin mask and the dry masking was stripped from the areas where no electro-conductive coating was desired. The inside of the tube was next sprayed with a layer of the masking composition of Example 7 and the first applied polyvinylacetate masking film was carefully stripped from the glass areas where the tin oxide coating was desired. The tube was then placed in a furnace at 1150° F. for about 2½ to 3 minutes and sprayed with a solution of stannic tetrachloride at this elevated temperature. The tube was allowed to cool to room temperature and the high temperature mask was washed from the tube with water.

EXAMPLE 9

Two 1 inch wide electrically conductive tin oxide bands were applied to the inside surface of a 2.5 inch diameter, 4.5 inch long bottomed glass tube for information storage and memory in the following manner: the inside surface of the tube was first coated with a fine coating of polyvinylacetate and the coating was cured at about 300° F. until it evidenced a clear film. Next, the desired band boundary lines were cut into the first applied mask and the mask covering the areas where no conductive coating was desired was removed and the entire inside surface was next coated with a second film forming composition of a high temperature masking agent consisting of 600 milliliters of butyl acetate, 10 grams of nitrocellulose and 200 grams of sodium sulfate. After the second mask was applied, the first applied polyvinylacetate strippable mask protecting the areas to be coated with the tin oxide was removed and the tubing was heated to about 1200° F. for 2 to 3 minutes in an electrically heated furnace. Finally, the inside surface of the glass tube was sprayed with an alcoholic-aqueous solution of stannic chloride at the elevated temperature and then removed from the heated atmosphere and allowed to cool to room temperature. The stannic chloride solution employed herein consist of 500 milliliters of 99% isopropyl alcohol, 50 milliliters of water and 180 milliliters of stannic chloride. The bands produced were separated by 0.125 inch and no electrical continuity was found between coated bands.

EXAMPLE 10

Following the procedure as set forth in Example 9, the inside surface of a similar tube was again coated with the conditions and reagents being as described supra. The only difference in the present run was that metallic studs were inserted into the glass before coating and the buttons were placed so that at least two were in a single band. The resistance, as measured across two points of the diameter of a single band was 850 ohms. The resistance measurement from a stud to the band coating was 750 ohms.

The methods of the present invention can be used to fabricate items of commerce and science. For example, the methods can be used to apply electrical conductive patterns to the internal surfaces of electronic tubes such as those used in information and memory storage devices or instruments, to manufacture conductive grid designs on glass substrates, for fabricating geometric designs on insulators patterned heating elements, resistors and the like.

What is claimed is:

1. A method for producing an electrically conductive coating of a predetermined pattern on a glass substrate wherein said method comprises the steps of coating at least a portion of said substrate with a first layer of a strippable organic film of a polyvinylester polymer, applying heat at a temperature of about 200° F. to 340° F. to cure and set said organic film, cutting a predetermined pattern into said organic film, removing said strippable organic film from the surface areas of said predetermined pattern wherein no conductive coating is desired, coating the glass substrate with a second layer of a masking composition consisting essentially of n-butyl acetate, nitrocellulose and sodium sulfate, stripping the first layer of said applied organic film from the surface areas to be conductively coated, heating said glass substrate and coating it while hot at a temperature between 1000° F. to 1200° F. with a thin layer of a metatllic stannic compound to form an electrically conductive metallic oxide coating in the desired pattern and removing the second layer of said masking composition to produce the desired conductive pattern.

2. A method according to claim 1 wherein said organic mask is polyvinylacetate.

3. A method according to claim 1 wherein said metallic compound is stannic tetrachloride.

4. A method according to claim 1 wherein said metallic oxide is stannic oxide.

References Cited

UNITED STATES PATENTS

| | | | |
|---|---|---|---|
| 3,331,127 | 7/1967 | Kerkhof et al. | 117—212 |
| 3,227,589 | 1/1966 | Deutsch | 117—5.5 X |
| 3,210,214 | 10/1965 | Smith | 117—5.5 X |
| 3,080,232 | 3/1963 | Gilbody et al. | 117—212 X |
| 2,995,461 | 8/1961 | Boicey | 117—5.5 |
| 2,971,867 | 2/1961 | Lytle | 117—5.5 |
| 2,923,624 | 2/1960 | Hensler | 117—5.5 |

ALFRED L. LEAVITT, Primary Examiner

A. M. GRIMALDI, Assistant Examiner

U.S. Cl. X.R.

117—5.5, 38